(12) United States Patent
Dine et al.

(10) Patent No.: US 8,584,341 B2
(45) Date of Patent: Nov. 19, 2013

(54) METHOD OF SECURING A SHAFT TO A CONSTANT VELOCITY JOINT

(71) Applicant: Dana Automotive Systems Group, LLC, Maumee, OH (US)

(72) Inventors: Donald W. Dine, Whitehouse, OH (US); Boris A. Yablochnikov, Toledo, OH (US)

(73) Assignee: Dana Automotive Systems Group, LLC, Maumee, OH (US)

(*) Notice: Subject to any disclaimer, the term of this patent is extended or adjusted under 35 U.S.C. 154(b) by 0 days.

(21) Appl. No.: 13/747,136

(22) Filed: Jan. 22, 2013

(65) Prior Publication Data

US 2013/0134152 A1 May 30, 2013

Related U.S. Application Data

(62) Division of application No. 12/804,380, filed on Jul. 19, 2010.

(51) Int. Cl.
*B23K 13/01* (2006.01)
*F16D 3/223* (2011.01)

(52) U.S. Cl.
USPC .................................................. 29/515

(58) Field of Classification Search
USPC ............. 464/139–146, 904–906; 29/428, 515
See application file for complete search history.

(56) References Cited

U.S. PATENT DOCUMENTS

| 4,202,184 A | * | 5/1980 | Krude et al. ............. 464/146 |
| 4,813,808 A | * | 3/1989 | Gehrke ............. 464/146 X |
| 6,910,617 B2 | * | 6/2005 | Yablochnikov |
| 7,347,784 B2 | * | 3/2008 | Keller et al. |

FOREIGN PATENT DOCUMENTS

JP 2001304285 * 10/2001

* cited by examiner

*Primary Examiner* — Gregory Binda
*Assistant Examiner* — Josh Skroupa
(74) *Attorney, Agent, or Firm* — Marshall & Melhorn, LLC

(57) ABSTRACT

A constant velocity joint assembly, and a method of securing a shaft to the assembly, the joint assembly including an outer race with a first portion having a plurality of grooves and a second portion that extends from the first portion and is substantially parallel to the shaft. The method of securing the shaft to the assembly includes the step of magnetically pulse welding the shaft to the outer race.

10 Claims, 3 Drawing Sheets

METHOD OF SECURING A SHAFT TO A CONSTANT VELOCITY JOINT

This is a divisional patent application filed during the pendency of U.S. patent application Ser. No. 12/804,380 filed on Jul. 19, 2010 from which the present application claims priority to and fully incorporates by reference.

FIELD OF THE INVENTION

The present invention relates to a constant velocity joint assembly and a method of securing a shaft to the assembly.

BACKGROUND OF THE INVENTION

Constant velocity joints allow a rotating shaft to transmit power through a variable angle, at constant rotational speed, without an appreciable increase in friction or play. There are many prior art designs for these joints, but all of them suffer from the same disadvantages.

More particularly, the prior art joints are generally disk shaped structures that are bolted to a flange or have an extension off of the back of the joint for a wire, laser or magnetic arc weld. The relatively thin nature of the prior art designs do not lend themselves to providing a sufficient welding surface upon which a tube, such as a drive shaft tube, can be connected directly therewith using a lap joint or without additional structures.

The prior art designs also typically utilize an elastomeric boot to prevent dust, dirt and moisture from entering the joint. The prior art boots, however, extend from the joint face or from a boot can mounted to the face which leaves them exposed to many different environments and conditions where they can be easily damaged. It would, therefore, be advantageous for a joint design to have a way of protecting the boot from damage.

Further, it is well-known that vehicle manufacturers are striving to eliminate excessive weight where ever possible in vehicles, reduce costs for the vehicle parts, increase performance, and provide an aesthetically pleasing design. It would therefore be further advantageous for a joint to be lightweight. Weight savings can be achieved by reducing or eliminating the hardware, such as bolts and flanges, required to connect the joint to tubes or other structures. It can be appreciated that with the reduction or elimination of connection hardware, cost savings can be achieved as well as a joint that has a cleaner appearance.

SUMMARY OF THE INVENTION

One embodiment of the invention is directed toward a constant velocity joint assembly. The assembly may have a shaft with an outer surface where at least a portion of the outer surface has a substantially constant outer diameter. An outer race is provided and has an inner surface with a first portion and a second portion directly abutting the first portion. The first portion may define a plurality of grooves and the second portion may be parallel with the outer diameter of the shaft.

Another embodiment of the invention is directed toward a method of securing a shaft to the constant velocity joint assembly. This method may comprise the steps of providing the outer race as described above and also having an outer surface. The method may further comprise the step of locating the outer race within a hollow end portion of a shaft. An inductor may be located axially relative to the outer race and the tube where it is then energized to magnetically pulse weld the two together.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
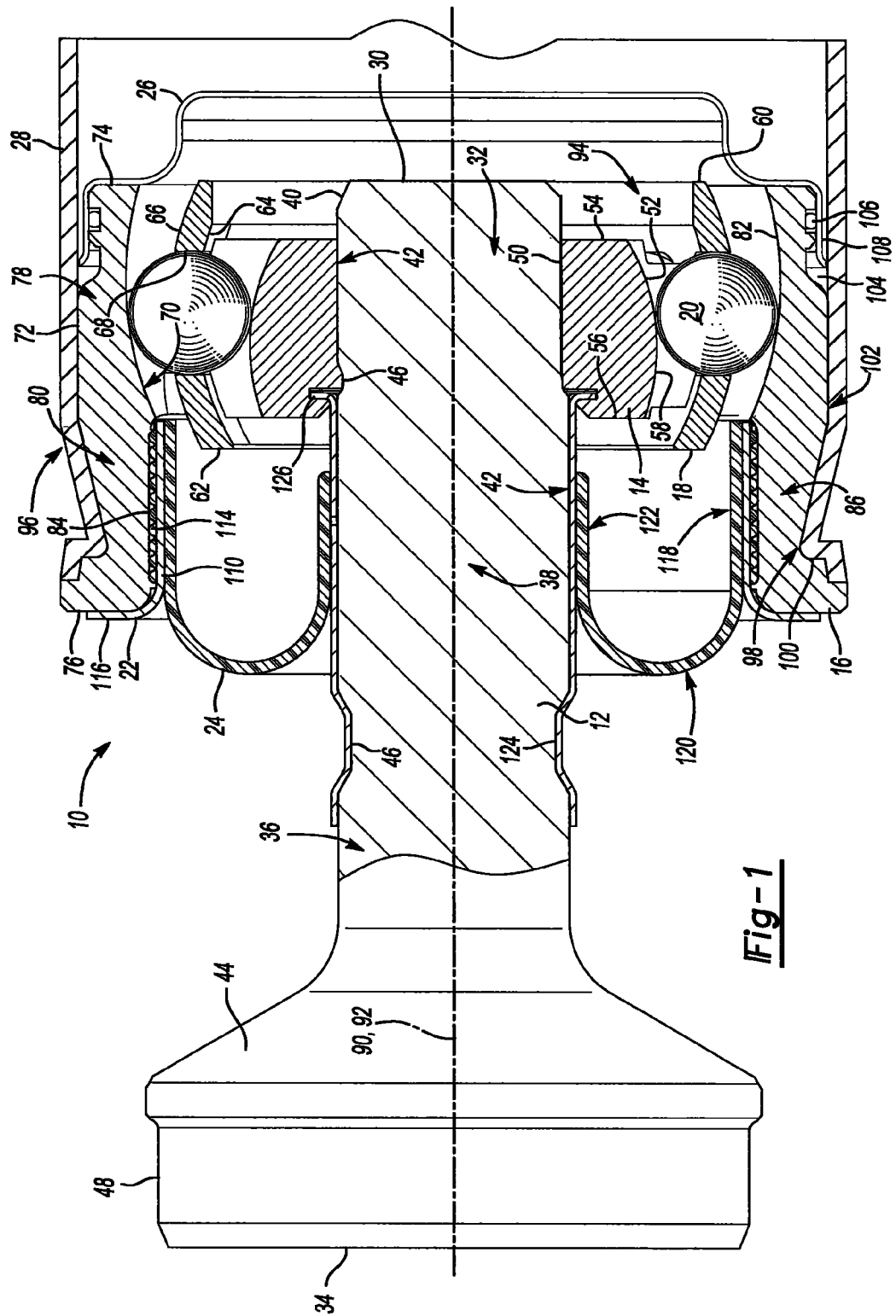
FIG. 1 is a cut-away side view of a joint assembly of the present invention.

Turning now to FIG. 1, one embodiment of a constant velocity joint assembly 10 is depicted. FIG. 1 is for illustrative purposes only; other constant velocity joints including double offset, N+N, Rzeppa, plunging, tripod, undercut free, crossgroove and Weiss may be used with the present invention without limitation.

The assembly 10 comprises a shaft 12, such as a stub shaft, an inner race 14, an outer race 16, a cage 18 and ball bearings 20. The assembly 10 may, in one embodiment, also comprise a boot can insert 22, a boot 24 and a dust cap 26. The assembly may also comprises a drive shaft 28, as will be described below.

The shaft 12 is provided with a first end 30, a first end portion 32, a second end 34, a second end portion 36 and a body portion 38 located between the first and second ends 30, 34. The first end 30 may have radiused or chamfered corners 40, or the corners 40 may have ninety degree angles.

The first end portion 32 defines a substantially constant outer diameter 42 of the shaft 12. The second end portion 36 may have an expanding section 44, formed in a unitary fashion with the body portion 38. One or more circumferential grooves 46 may be located in either the first end portion 32 or the second end portion 36, or both. The end portions 32, 36 otherwise have substantially constant outer diameters.

The expanding section 44 has an outer surface 48 upon which, or with which, a tube (not shown) may be connected. The tube may be connected mechanically to the outer surface 48 of the expanding section 44 and/or by welding, friction fitting, crimping, adhesives or combinations of the foregoing.

The inner race 14 is provided with an inner surface 50, an outer surface 52, a first end 54 and a second end 56. The inner surface 50 of the inner race 14 is secured to the first end portion 32 of the shaft 12. Often, the first end 54 of the inner race 14 is axially offset from the first end 30 of the shaft 12.

The outer surface 52 of the inner race 14 is provided with a plurality of circumferentially spaced apart grooves 58. The grooves 58 preferably extend from the first end 54 of the inner race 14 to the second end 56 of the inner race 14. The outer surface 52 of the inner race 14 may have a curvilinear shape.

Preferably, the inner surface 50, the outer surface 52, the ends 54, 56 and the grooves 58 are unitary with one another.

The cage 18 is provided with a first end 60, a second end 62, an inner surface 64 and an outer surface 66. A plurality of apertures 68 is located in the cage 18 and they extend from the inner surface 64 to the outer surface 66.

The first end 60 of the cage 18 is shown axially aligned with the first end 30 of the shaft 12. Further, the first end 60 of the cage 18 extends axially beyond the first end 54 of the inner race 14. The second end 62 of the cage 18 extends axially beyond the second end 56 of the inner race 14. The inner surface 64 and the outer surface 66 of the cage 18 may be curvilinear.

Preferably, each of the ends 60, 62 and surfaces 64, 66 are unitary with one another.

The outer race has an inner surface 70, an outer surface 72, a first end 74, a second end 76, a first body portion 78 and a second body portion 80. Preferably, each of the foregoing are unitary with one another. The outer race 70 has an overall cylindrical shape formed by the inner surface 70 and the outer surface 72.

The first end 74 of the outer race 16 is slightly axially offset from the first end 60 of the cage 18 and the first end 30 of the shaft 12. The first body portion 78 extends from the first end 74 axially inwardly into the race 16. The inner surface 70 at the first body portion 78 comprises a plurality of grooves 82 and may be curvilinear. The number of grooves 82 is equal to the number of grooves 58 on the inner race 14.

The inner surface 70 of the second body portion 80 has a substantially constant diameter portion 84. As such, it forms a cylindrical type extension, or boot can 86, from the first body portion 78. The substantially constant diameter portion 84 of the inner surface 70 is preferably parallel with the diameter 42 of the shaft 12 in one embodiment while the assembly 10 is in the orientation depicted in FIG. 1. The substantially constant diameter portion 84 of the inner surface 70 is preferably parallel with the drive shaft 28 in any orientation of the assembly 10.

One ball bearing 20 may be located within each aperture 68 of the cage 18. Each ball bearing 20 preferably rotates and moves along one of the grooves 82 of the outer race 16 and one of the grooves 58 in the inner race 14.

The above-described structure permits the shaft 12 to move with respect to the outer race 16. Thus, in one embodiment, a longitudinal axis 90 of the shaft 12 may be aligned with a longitudinal axis 92 of the outer race 16. In this embodiment, the joint assembly 10 is a zero articulation angle orientation. Either the outer race 16 may be located at an angle with respect to the shaft 12 or vice versa. However, in another embodiment (not shown), the two axes 90, 92 may be at an angle with respect to one another. In the non-depicted embodiment, which is well-known to those skilled in the art, there will be an articulation angle for the joint assembly 10.

The inner surface 70 of the outer race 16 defines an inner void 94 in which at least the first end 32 portion of the shaft 12, the inner race 14, the cage 18 and the ball bearings 20 reside.

The second end 76 of the outer race 16 may form a ninety degree angle with respect to the inner surface 70 of the second body portion 80. Other angles other than ninety degrees are permissible.

The outer surface 72 of the outer race 16 has a portion 96 located radially outward from the substantially constant diameter portion 84. A depression 98 in the above-mentioned portion of the outer surface 72 is provided. At least one step 100 is located directly beside the depression 98, adjacent the second end 76, and extends radially outward therefrom. In the depicted embodiment, two steps 100 are provided, although any number of steps are permissible.

The outer surface 72 of the outer race 16 also has a substantially constant outer diameter portion 102 located radially outward from the plurality of grooves 82. The constant outer diameter portion 102 may extend from the depression 98 to the first end 74 or, as shown in FIG. 1, a recess 104 for the dust cap 26 and seal 106 may be provided therein.

Preferably, the recess 104 is dimensioned so that an outer surface 108 of the dust cap 26 provides an overall planar surface with the rest of the outer surface 72 of the outer race 16 at that end of the outer race 16. The seal 106 may be such as an O-ring and may be located within the recess 104 to seal the outer race 16 with the dust cap 26. Alternatively, a liquid sealant can be applied to the first end 74 to secure the dust cap 26 thereto. The O-ring can be omitted when the sealant is utilized.

The dust cap 26 may extend from the outer surface 72 of the outer race 16, across the ball bearing 20, across the cage 18, across the inner race 14 and across the first end of the shaft 30 so as to provide a substantially impenetrable barrier to dust, debris, moisture and the like.

A first leg 110 of the boot can insert 22 may be located along the substantially constant diameter portion 84 of the inner surface 70 of the outer race 16. The first leg 110 may be secured to the constant diameter portion 84 of the outer race 16 by mechanical fasteners, welding, adhesives and/or frictional engagement at portion 112 of the boot can insert 22. A seal 114 may be located between the outer race 16 and the boot can 22.

A second leg 116 of the boot can insert 22 extends substantially perpendicularly to the first leg 110. The second leg 116 extends parallel to the second end 76 of the outer race 16. The second leg 116 may be secured to the second end 76 in a similar manner to that of the first leg 110 and the outer race 16.

A first portion 118 of the flexible boot 24 may be located along the first leg 110 of the boot can insert 22. In the depicted embodiment, the first leg 110 extends substantially entirely along the first leg 110 of the boot can insert 22. The boot 24 may be secured to the insert 22 such as by friction, adhesive, vulcanization, mechanical fasteners and the like.

In the depicted embodiment, the boot 24 is provided with an outwardly extending curved portion 120. The boot 24, however, is not limited to this configuration. Instead, the boot 24 may be provided with an S-shape or any other configuration such that dirt, debris and moisture are kept out of the assembly 10.

A second portion 122 of the boot 24 may be located along, or adjacent, the substantially constant diameter portion 42 of the shaft 12. The second portion 122 may be secured to the shaft 12 such as by friction, adhesive, mechanical fasteners and the like. In the depicted embodiment, a collar 124 may be provided about the shaft 12. The collar 124 may extend to the inner surface 50 of the inner race 14 where a leg 126 extends radially into the inner race 14. The second portion 122 of the boot 24 may be attached to the collar 124 by vulcanization, adhesives, mechanical fasteners or the like.

The second body portion 80 of the outer race 16 advantageously functions to shroud and protect the boot 24 from any damage. Further, the second body portion 80 of the outer race 16 facilitates heat transfer out of the joint assembly 10 during operation of the assembly 10 via the drive shaft 28. This permits a greater power density to be used with a magnetic pulse welding process verses the traditional wire welded or magnetic arc welded assemblies. Additionally, the heat transfer should be better than friction welded assemblies because the magnetic pulse welding weld has a closer proximity to the heat generating joint running surfaces.

Figure 2:
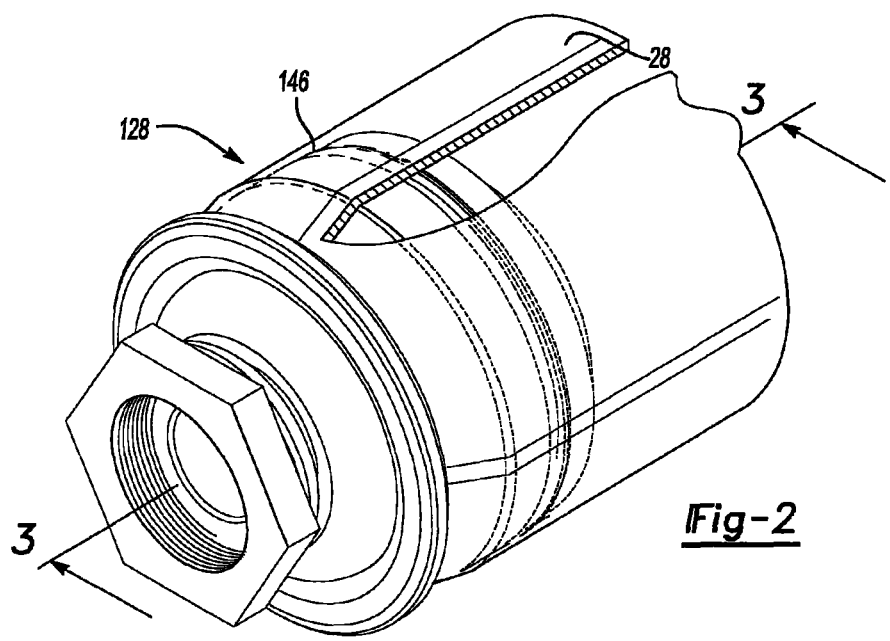
FIG. 2 is partial perspective view of another joint assembly of the present invention.
Figure 3:
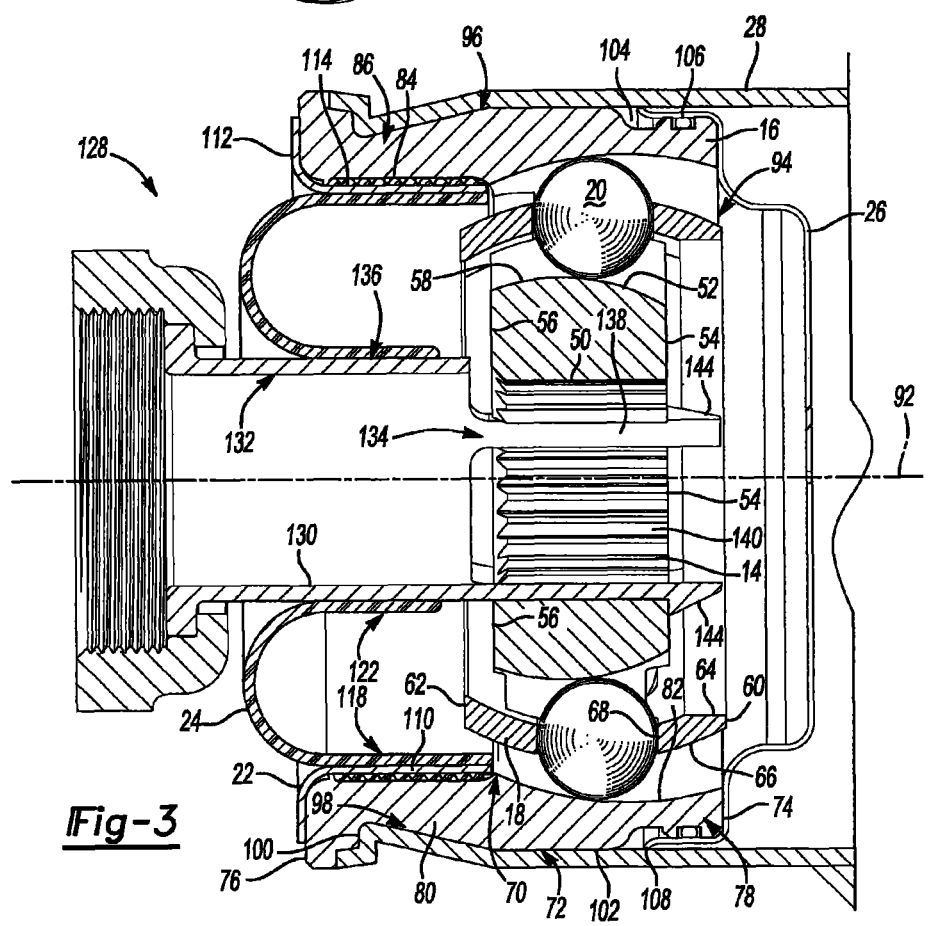
FIG. 3 is a cut-way side view along lines 3-3 of FIG. 2.

Yet another embodiment of the present invention is depicted in FIGS. 2 and 3. It may be readily appreciated that the joint assembly 128 depicted in FIGS. 2 and 3 has many of the same components as discussed above and depicted in FIG. 1. The same reference numbers have been used where there is identity between the components of FIGS. 1 and 2 and 3.

FIGS. 2 and 3 additionally depict a tube 130 having a first end portion 132 and a second end portion 134. The first portion 132 has a substantially constant diameter portion 136. The second end portion 134 has a plurality of axially extending prongs 138. The prongs 138 extend along internal splines 140 of the inner race 14 and barbs 144 on the prongs 138 engage with the first end 54 of the inner race 14.

The first leg 110 of the boot can insert 22 is parallel to the substantially constant diameter portion 136 of the tube 130 when the joint articulation angle is zero, as shown in the Figures. Additionally, the second end 62 of the cage 18 is permitted to axially extend into the boot can insert 22. In the depicted embodiment, the second end 56 of the inner race 14 terminates at the end of outer race grooves 82.

The first portion 118 of the flexible boot 24 may be located along the first leg 110 of the boot can insert 22 as previously discussed. The second portion 122 of the boot 24 may be located along the substantially constant diameter portion 136 of the tube 130. The second portion 122 may be secured to the tube 130 such as by friction, adhesive, vulcanization, mechanical fasteners and the like.

Figure 4:
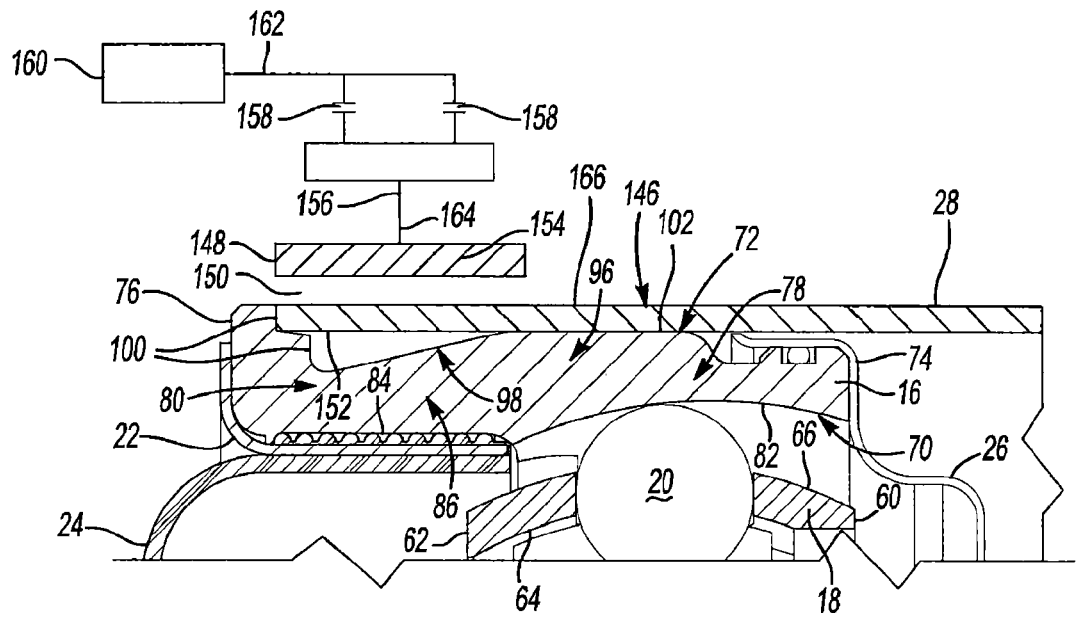
FIG. 4 is a schematic side view of an initial step in the method of securing a shaft and the joint assembly.
Figure 5:
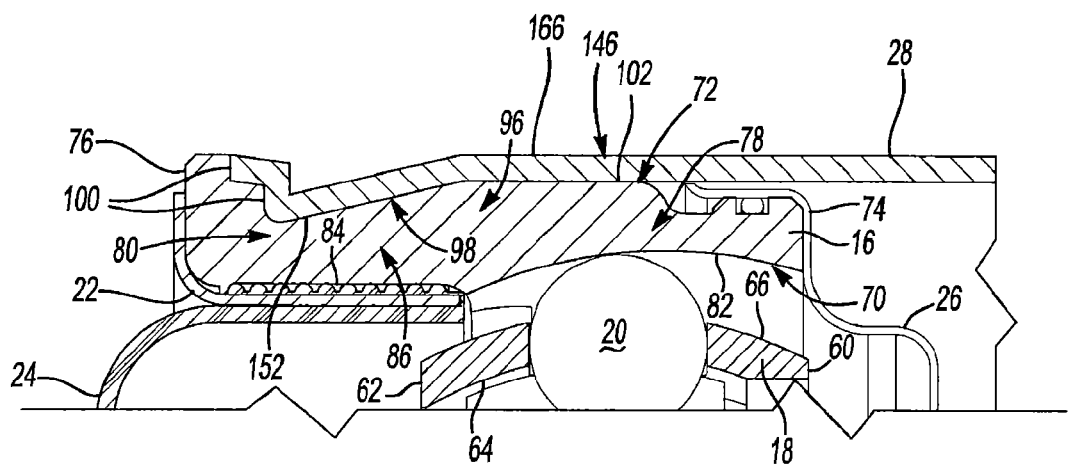
FIG. 5 is a schematic side view of a step subsequent to FIG. 4.

The steps of securing the drive shaft 28 to either constant velocity joint assembly 10, 128 include the step of locating the outer race 16 within a drive shaft 28 having a hollow end portion 146, as shown in FIG. 4. The outer race 16 is located with the end portion 146 until the end portion 146 extends at least to the depression 98 in the outer surface 72. Preferably, the end portion 146 is sufficiently located over the outer surface 72 so that it can be subsequently located within the depression 98 and steps 100 of the outer surface 72 of the outer race 16.

The drive shaft 28 is preferably metallic and may be such as aluminum, and in particular, strong aluminum alloys, such as 6061T aluminum alloy.

An inductor 148 is located axially relative to the outer race 16 and the drive shaft 28. A gap 150 may exist between the outer surface 146 of the shaft 28 and the inductor 148. The gap 150 may be a constant dimension or it may vary, as seen by a lower surface 152 of the shaft 28.

The inductor 148 is energized to magnetically pulse weld the shaft 28 and the outer race 16 together. The inductor 148 and the magnetic pulse welding technique are depicted and described in U.S. Pat. Nos. 7,015,435, 6,891,137, 6,703,594, 6,531,688, 6,379,254, 5,981,921, 7,026,585, 4,129,846 and RE41,101, which are all incorporated by reference in their entireties. These patents are owned by the assignee of the present application.

The inductor 148 includes an inductor coil 154. The coil 154 may be such as a high strength single-turn coil or a plurality of generally close packed, but spaced apart, circular or annular electrical conductor strips. Insulators (not shown) may be located between the strips.

The inductor 148 includes leads 156 or terminals to high voltage capacitors 158. The capacitors 158 are connected to a source of electrical power 160 via a charging circuit 162. The current required for successfully welding a shaft 28 to the outer race 16 is on the order of at least several hundred thousand amps and possibly as high as one million amps or more. Therefore, the circuit, through which the current is discharged, must be suitable for conducting a current of great magnitude.

The discharge circuit 164 includes a discharge switch (not shown) which when activated allows the capacitors to discharge and supply an energy surge to the inductor 148. The inductor 148 creates a strong magnetic field that exerts a force against the outer surface 166 of the shaft 28. The discharge switch, therefore, must also suitable for conducting the high currents in the circuit.

The effect of the intense, momentary magnetic field on the metallic shaft 28 is to create an extremely powerful force which repels the shaft 28 radially inward from the inductor 148. The magnetic field created by the pulse of current through the inductor 148 creates strong reactive eddy currents in the shaft 28. These eddy currents create opposing magnetic fields which result in inwardly directed forces on the shaft 28. These forces cause the shaft 28 to collapse about the outer race 16 with such impact that the shaft 28 is welded to the outer race 16. The velocity of the shaft 28 when it comes into contact with outer race 16 is preferably at least 300 meters per second and more preferably within the range from about 300 to 400 meters per second.

The end portion 146 is welded to the substantially constant diameter portion of the outer race 102, the depression 98 and/or the step 100. It may be appreciated that the end portion 146 may be welded to one or more of these features of the outer race.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method of securing a shaft to a constant velocity joint assembly, comprising:
    providing an outer race comprising:
        an inner surface with a plurality of grooves on a first portion and a substantially constant diameter portion on a second portion interfacing with a boot can; and
        an outer surface having a first portion located radially outward from said inner surface first portion and a second portion located radially outward from said substantially constant diameter portion, said second portion of said outer surface comprising a depression in said outer surface, said depression transitioning directly to at least one radially extending step, said first portion of said outer surface having a recess therein for receiving a dust cover and a dust cover seal therein;
    locating said outer race within a driveshaft having a hollow end portion, said driveshaft extending over said outer race outer surface first portion and said depression to said radially extending step;
    locating an inductor at least over said depression;
    energizing said inductor to magnetically pulse weld said shaft and said outer race together; and
    locating a stub shaft at least partially within an inner race, wherein a collar is located at least partially about said stub shaft, said collar extending to said inner race.

2. The method of claim 1, wherein said inductor generates a magnetic field that drives said driveshaft into direct contact with said plurality of grooves to weld said driveshaft and said plurality of grooves together.

3. The method of claim 2, wherein an end portion of said driveshaft takes on a complimentary shape to said groove and said radially extending step after being welded thereto.

4. The method of claim 3, wherein said driveshaft tube extends over said dust cover recess and does not extend therein.

5. The method of claim 1, wherein a radially extending leg of said collar extends into said inner race to secure said inner race and said stub shaft in an axially secure relationship.

6. The method of claim 5, wherein said collar leg extends into an inner surface of said inner race.

7. The method of claim 6, wherein a boot can insert is located in direct contact with said outer race inner surface and a portion of a boot.

8. The method of claim 7, wherein said outer race second portion transfers facilitates heat out of said joint assembly.

9. The method of claim 7, wherein said second portion of said outer race axially extends over at least a portion of said boot to protect said boot from damage.

10. The method of claim 5, wherein an elastomeric boot has a first portion extending along said collar and a second portion, parallel said first portion, extending along said substantially constant diameter portion of said second portion of said outer race inner surface.

* * * * *